US006968415B2

(12) United States Patent  
Bronson et al.

(10) Patent No.: US 6,968,415 B2
(45) Date of Patent: Nov. 22, 2005

(54) OPAQUE MEMORY REGION FOR I/O ADAPTER TRANSPARENT BRIDGE

(75) Inventors: Timothy C. Bronson, Vestal, NY (US); Stefan P. Jackowski, Endicott, NY (US); John M. Sheplock, Raleigh, NC (US); Phillip G. Williams, Owego, NY (US)

(73) Assignee: International Business Machines Corporation, Armonk, NY (US)

( * ) Notice: Subject to any disclaimer, the term of this patent is extended or adjusted under 35 U.S.C. 154(b) by 481 days.

(21) Appl. No.: 10/113,299

(22) Filed: Mar. 29, 2002

(65) Prior Publication Data

US 2003/0188076 A1    Oct. 2, 2003

(51) Int. Cl.[7] .............................................. G06F 13/36
(52) U.S. Cl. ......................... 710/306; 710/29; 710/36; 710/52; 711/2; 345/564
(58) Field of Search ............................... 710/302, 306, 710/260, 305, 29, 36, 52; 345/564; 711/2

(56) References Cited

U.S. PATENT DOCUMENTS

| | | | |
|---|---|---|---|
| 5,684,977 A | | 11/1997 | Van Loo et al. |
| 5,835,741 A | | 11/1998 | Elkhoury et al. |
| 5,884,027 A | * | 3/1999 | Garbus et al. ............... 709/250 |
| 5,924,110 A | * | 7/1999 | Pike et al. ...................... 711/2 |
| 5,937,170 A | | 8/1999 | Bedarida |
| 6,119,185 A | * | 9/2000 | Westerinen et al. ......... 710/104 |
| 6,173,383 B1 | | 1/2001 | Casamatta |
| 6,175,889 B1 | | 1/2001 | Olarig |
| 6,223,230 B1 | | 4/2001 | Garnett et al. |
| 6,247,079 B1 | * | 6/2001 | Papa et al. ................... 710/302 |
| 6,314,501 B1 | | 11/2001 | Gulick et al. |
| 6,525,739 B1 | * | 2/2003 | Gurumoorthy et al. ..... 345/566 |
| 6,823,421 B2 | * | 11/2004 | Luse et al. ................... 710/314 |

OTHER PUBLICATIONS

Tundra, "Tsi310 Feature Sheet, 133 MHz PCI-X Bus Bridge", Tundra Semiconductor Corporation.*
Intel, "Intel 31154 MHz PCI Bridge", Intel, Inc., http://www.intel.com/design/bridge/31154.htm.*
Steve Moore, "Bridging the PCI-X Gap in Multi-Processor Comm Architectures", 2004, CommsDesign.Com, http://commsdesign.com/showarticle.jhtml?articleid=52601399.*

* cited by examiner

Primary Examiner—Glenn A. Auve
Assistant Examiner—Justin King
(74) Attorney, Agent, or Firm—William E. Schiesser; Hoffman, Warnick & D'Alessandro LLC

(57) ABSTRACT

An opaque memory region for a bridge of an I/O adapter. The opaque memory region is inaccessible to memory transactions which traverse the bridge either from a primary bus to secondary bus or secondary bus to primary bus. As a result, memory transactions which target the opaque memory region are ignored by the bridge, allowing for the same address to exist on both sides of the bridge with different data stored in each. The implementation of the opaque memory region provides a means to complete memory transactions within I/O adapter subsystem memory, hence, relieving host computer system memory resources. In addition, a number of I/O adapters can be used in a host computer system where the host and all the I/O devices use some of the same memory addresses.

20 Claims, 4 Drawing Sheets

OPAQUE MEMORY REGION FOR I/O ADAPTER TRANSPARENT BRIDGE

BACKGROUND OF THE INVENTION

1. Technical Field

The present invention relates generally to memory transactions and, more particularly, to an opaque memory region for a PCI bridge.

2. Related Art

Transparent peripheral component interconnect (PCI) bridges or transparent peripheral component interconnect extended (PCIx) bridges (cumulatively referred to herein as "transparent PCI/PCIx bridges") are often used within a computer system to provide electrical isolation or to segregate devices based on speed, bus width or other characteristics. The requirements and features specified for a transparent PCI/PCIx bridges are set out in the PCI Special Interest Group, PCI Local Bus Specification, Revision 2.2, Dec. 18, 1998; PCI Special Interest Group, PCI-to-PCI Bridge Architecture Specification, Revision 1.1, Dec. 18, 1998; and the PCI Special Interest Group, PCI-X Addendum to the PCI Local Bus Specification, Revision 1.0a, Jul. 24, 2000 (hereinafter cumulatively referred to as "the PCI Specifications"). One characteristic of a PCI/PCIx based computer system is that it regards all system memory as a single memory address space, i.e., it looks at all system memory resources as a single entity despite their distributed nature. The single memory address space is shared by the host complex and all memory mapped I/O devices.

Referring to FIG. 1, forwarding of memory transactions 2 between a primary bus 4 and a secondary bus 6 by a transparent PCI/PCIxbridge is shown. A "primary bus" is the PCI interface that is connected to the PCI bus closest to the host CPU, and a "secondary bus" is the PCI interface that is connected to the PCI bus farthest from the host CPU. In order to maintain the integrity of the single memory address space 10, each transparent PCI/PCIx bridge is required to reserve (or allocate) a memory address range 12 of space 10 for a respective I/O device. (The PCI Specifications allow a bridge to claim two separate memory address ranges—prefetchable and non-prefetchable—but only one is illustrated in FIG. 1. Each memory address range allowed by the PCI Specifications is transparent and function as illustrated in FIG. 1.) Memory address range 12 reserved by the bridge may be specified by the contents of the bridge's memory base address register and its memory limit address register. Memory transactions 2 that are claimed by the bridge, and target range 12, must be logically unaffected by the bridge regardless of whether the transactions are initiated on the primary 4 or secondary bus 6. As shown, a memory transaction 2A initiated on primary bus 4 of the bridge (left side of FIG. 1) is claimed and passed through to secondary bus 6 of the bridge (right side of FIG. 1) if it falls within memory address range 12. If a memory transaction 2B initiated on primary bus 4 does not fall within address range 12, it is not claimed by the bridge. A memory transaction 2C initiated on secondary bus 6 of the bridge is claimed and passed through to primary bus 4 of the bridge if it falls outside range 12. If a memory transaction 2D initiated on secondary bus 6 is within memory address range 12, it is not claimed by the bridge. Under normal circumstances, the above functional characteristics are not detrimental.

However, PCI/PCIx bridges are also used in high function input-output (I/O) adapters, e.g., for use with hard drives, that may include a processor and an entire computer subsystem implemented on the secondary bus of the bridge. In these settings, it is desirable to maintain a separation of resources that conventional transparent PCI/PCIx bridges are incapable of providing. The separation of resources is advantageous, for example, because the computer subsystem used in the aforementioned high function I/O adapter setting may require a large but sparsely populated memory range. Furthermore, it is often convenient or desirable to "hard wire" the memory addresses of memory mapped I/O devices and resources within the computer subsystem contained on the high function I/O adapter. This function is impossible with conventional transparent PCI/PCIx bridges.

Another problem arises relative to storage networking I/O adapters, which typically use an architecture where the I/O devices are hidden from the host operating system (OS) and basic input-output system (BIOS). As a result, the computer subsystem thereon must claim additional memory resources from the host for these devices. Due to the accelerated growth of I/O subsystems, host memory resources are becoming increasingly overburdened. The coexistence of many of these adapters within the same computer system is therefore difficult or impossible without some method to circumvent the sharing of a single memory address space by the host and all the attached I/O devices.

In view of the foregoing, there is a need in the art for a PCI bridge for an I/O adapter that provides transparent PCI/PCIx bridge functionality, but also allows for separation of memory resources.

SUMMARY OF THE INVENTION

The invention provides an I/O adapter having a bridge that provides a memory region that is inaccessible to memory transactions which traverse the bridge either from a primary bus to secondary bus or secondary bus to primary bus, i.e., an opaque memory region. As a result, memory transactions which target the opaque memory region are ignored by the bridge, allowing for the same address to exist on both sides of the bridge with different data stored in each. The implementation of the opaque memory region provides a means to complete memory transactions within I/O adapter subsystem memory, hence, relieving host computer system memory resources. In addition, a number of I/O adapters can be used in a host computer system where the host and all the I/O devices use some of the same memory addresses.

A first aspect of the invention is directed to a bridge for forwarding memory transactions between a primary bus and a secondary bus, the bridge comprising: a memory address range reserver that claims a range of system memory; an opaque memory region reserver that claims an opaque memory region of system memory; and a memory transaction forwarding module that: a) forwards a memory transaction from the primary bus to the secondary bus only when the memory transaction falls within the range and outside of the opaque memory region, and b) forwards a memory transaction from the secondary bus to the primary bus only when the memory transaction falls outside of the range and outside of the opaque memory region.

A second aspect of the invention is directed to a method of forwarding memory transactions on a bridge between a primary and a secondary bus, the method comprising the steps of: reserving a memory address range of system memory; reserving an opaque memory region of system memory; and forwarding a memory transaction: a) from the primary bus to the secondary bus only when the memory transaction falls within the range and outside of the opaque memory region, and b) from the secondary bus to the primary bus only when the memory transaction falls outside of the range and outside of the opaque memory region.

A third aspect of the invention is directed to a computer program product comprising a computer useable medium having computer readable program code embodied therein, the program product comprising: program code configured to reserve a memory address range of system memory; program code configured to reserve an opaque memory region of system memory; and program code configured to forward a memory transaction: a) from the primary bus to the secondary bus only when the memory transaction falls within the range and outside of the opaque memory region, and b) from the secondary bus to the primary bus only when the memory transaction falls outside of the range and outside of the opaque memory region.

A fourth aspect of the invention is directed to an input-output (I/O) adapter for communicating between a primary bus and a secondary bus, the I/O adapter comprising: a bridge for forwarding memory transactions between the primary bus and the secondary bus, the bridge including: a memory address range reserver that claims a range of system memory; an opaque memory region reserver that claims an opaque memory region of system memory; and a memory transaction forwarding module that: a) forwards a memory transaction from the primary bus to the secondary bus only when the memory transaction falls within the range and outside of the opaque memory region, and b) forwards a memory transaction from the secondary bus to the primary bus only when the memory transaction falls outside of the range and outside of the opaque memory region.

A fifth aspect of the invention is directed to a computer system comprising: a central processing unit; a plurality of I/O devices; a primary bus in communication with the central processing unit; and an I/O adapter for each I/O device, at least one I/O adapter including a bridge for forwarding memory transactions between the primary bus and a secondary bus, the bridge including: a memory address range reserver that claims a range of system memory; an opaque memory region reserver that claims an opaque memory region of system memory; and a memory transaction forwarding module that: a) forwards a memory transaction from the primary bus to the secondary bus only when the memory transaction falls within the range and outside of the opaque memory region, and b) forwards a memory transaction from the secondary bus to the primary bus only when the memory transaction falls outside of the range and outside of the opaque memory region.

The foregoing and other features of the invention will be apparent from the following more particular description of embodiments of the invention.

BRIEF DESCRIPTION OF THE DRAWINGS

The embodiments of this invention will be described in detail, with reference to the following figures, wherein like designations denote like elements, and wherein.

DETAILED DESCRIPTION OF THE INVENTION

Figure 1:
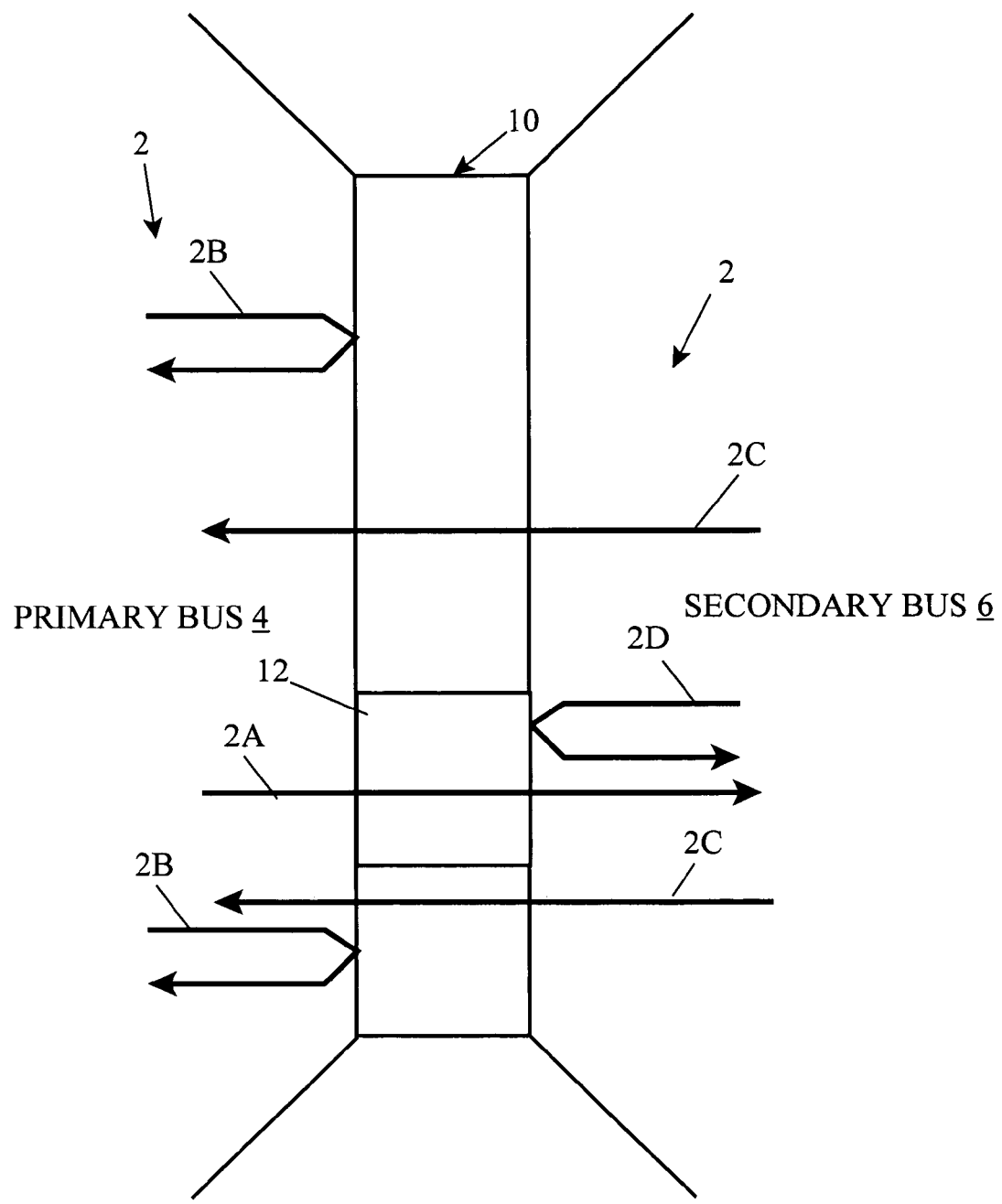
FIG. 1 shows memory transaction forwarding by a conventional transparent PCI/PCIx bridge.
Figure 2:
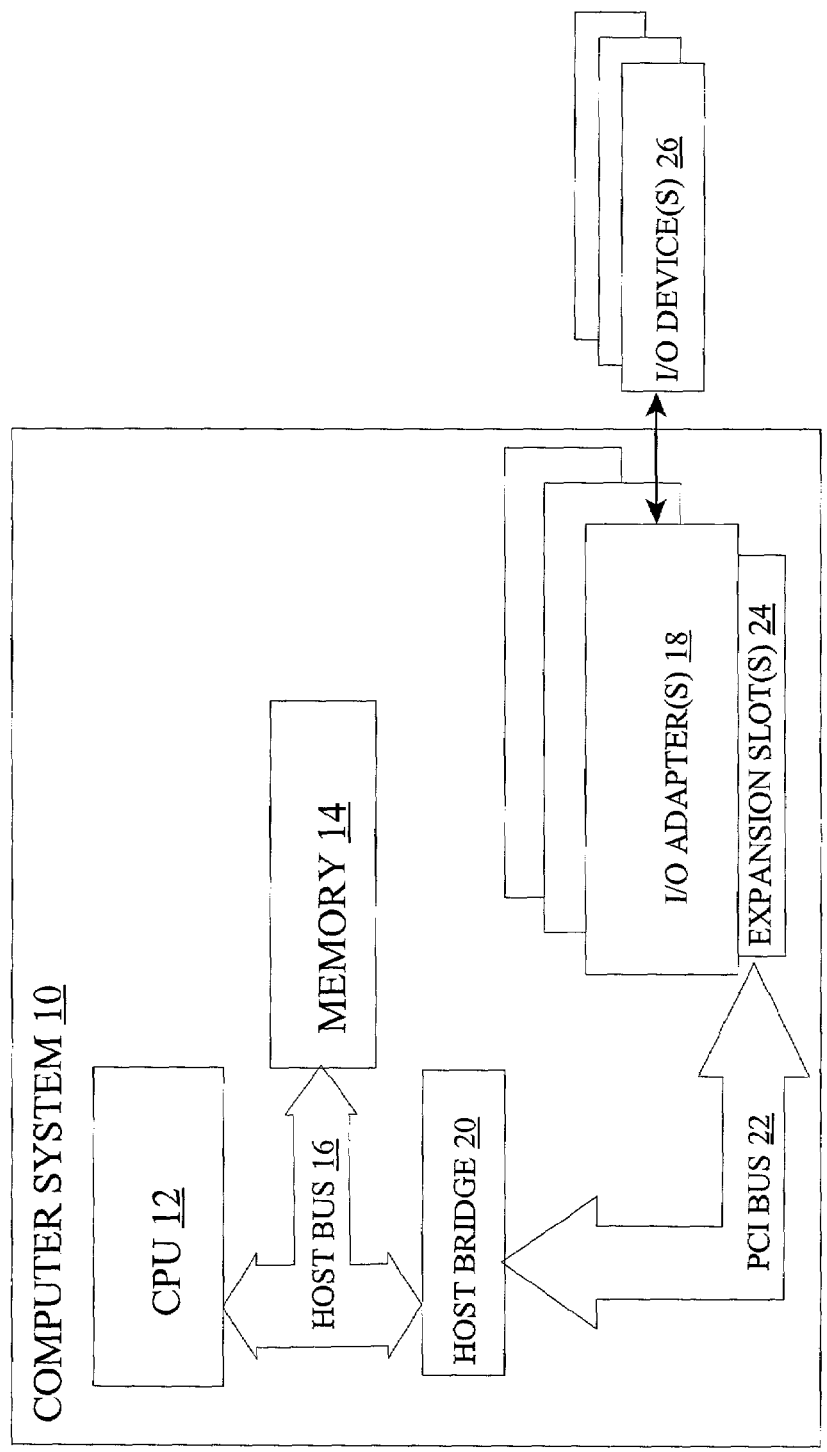
FIG. 2 shows a block diagram of a computer system including an I/O adapter with a PCI bridge with an opaque memory region according to the invention.

For purposes of clarity only, the description includes the following topics:

I. Host Computer System Overview
II. I/O Adapter With Bridge Having Opaque Memory Region
III. Operation Of Bridge With Opaque Memory Region
IV. Opaque Memory Region Implementation I. Host Computer System Overview With reference to the accompanying drawings, FIG. 2 is a block diagram of a host computer system 10 in accordance with the invention. Computer system 10 generally includes a central processing unit (CPU) 12, a memory 14, a host bus 16 and at least one input/output (I/O) adapter 18. Additionally, a host bridge 20 may couple to a first PCI bus 22, which in turn couples to any of a number of expansion slots 24. Each expansion slot 24 may contain an I/O adapter 18. Each I/O adapter 18 couples to at least one I/O device 26. I/O device 26 may be any now known or later developed device. For purposes of brevity, although the term "PCI bridge" or "PCI bus" will be used, it should be recognized that PCI-to-PCI and/or PCIx-to-PCIx architecture is also intended. Memory 14 may include any of a variety applications that, when executed by CPU 12, comprises various functional capabilities of system 10. Memory 14 may also include any of a variety of well known data storage devices.

CPU 12 may comprise a single processing unit, or a plurality of processing units distributed across one or more locations. A typical server computer may include an advanced mid-range multiprocessor-based system, such as the RS6000 from IBM, utilizing standard operating system software, which is designed to drive the operation of the particular hardware and which is compatible with other system components and I/O adapters. Additional components such as cache memory, communication systems, system software, etc., may also be incorporated into system 10.

II. I/O Adapter with Bridge having Opaque Memory Region

Figure 3:
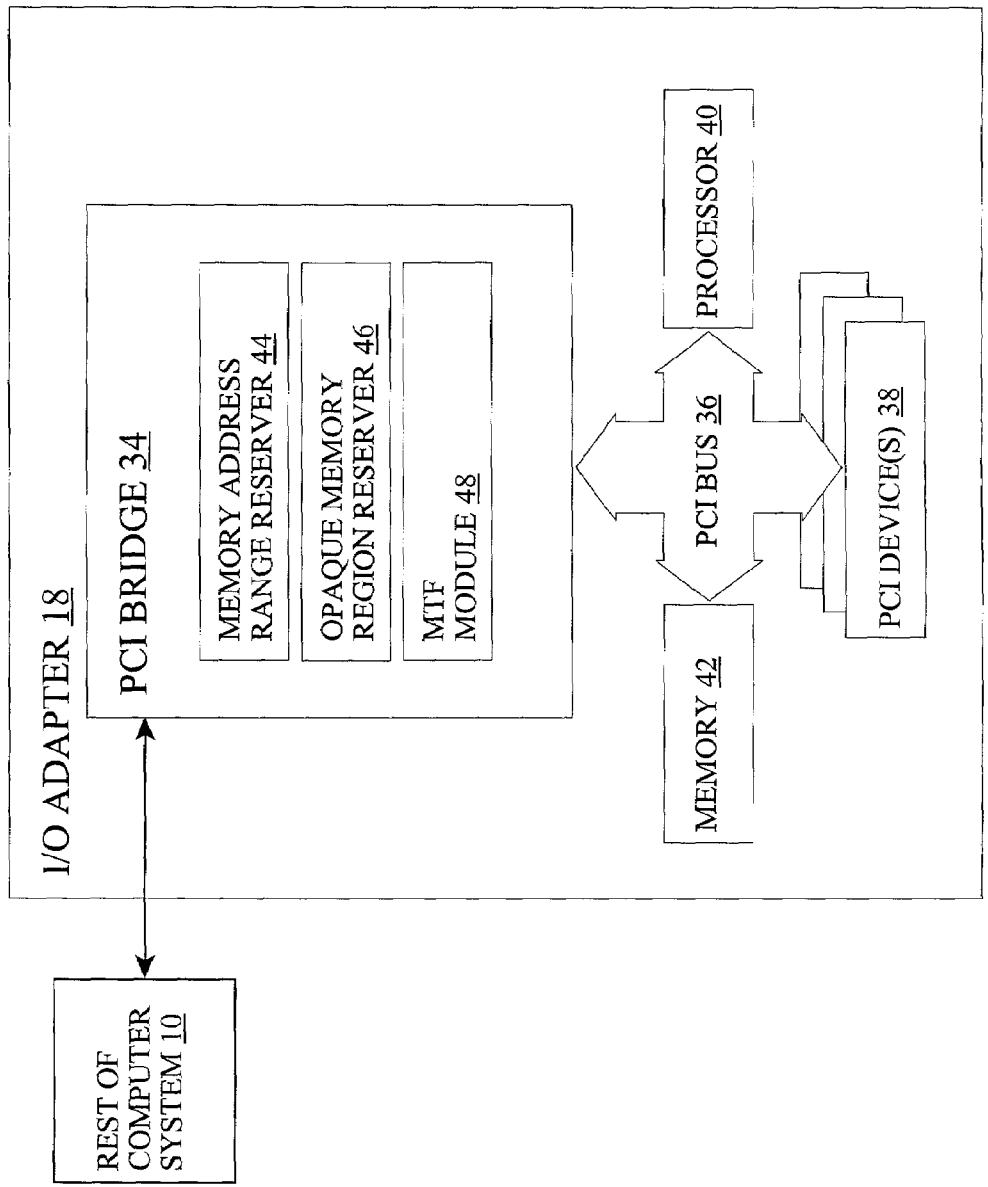
FIG. 3 shows a block diagram of the I/O adapter of FIG. 2.

Turning to FIG. 3, an exemplary I/O adapter 18 is shown. I/O adapter 18 may be of a peripheral component interconnect (PCI) or peripheral component interconnect extended (PCIx) type. I/O adapter 18 includes a PCI bridge 34 having a second PCI bus 36 coupled to at least one PCI device 38 and a dedicated processor 40. Memory 42 on adaptor or within I/O device 38 may also be provided. Processor 40 generally handles more high level commands such as data movement. Bridge 34 provides functionality that can be characterized as including, inter alia: a memory address range reserver 44, an opaque memory region reserver 46 and a memory transaction forwarding (MTF) module 48. I/O adapter 18 and bridge 34 may include other components known to those skilled in the art, and not shown for clarity.

III. Operation of Bridge with Opaque Memory Region

Figure 4:
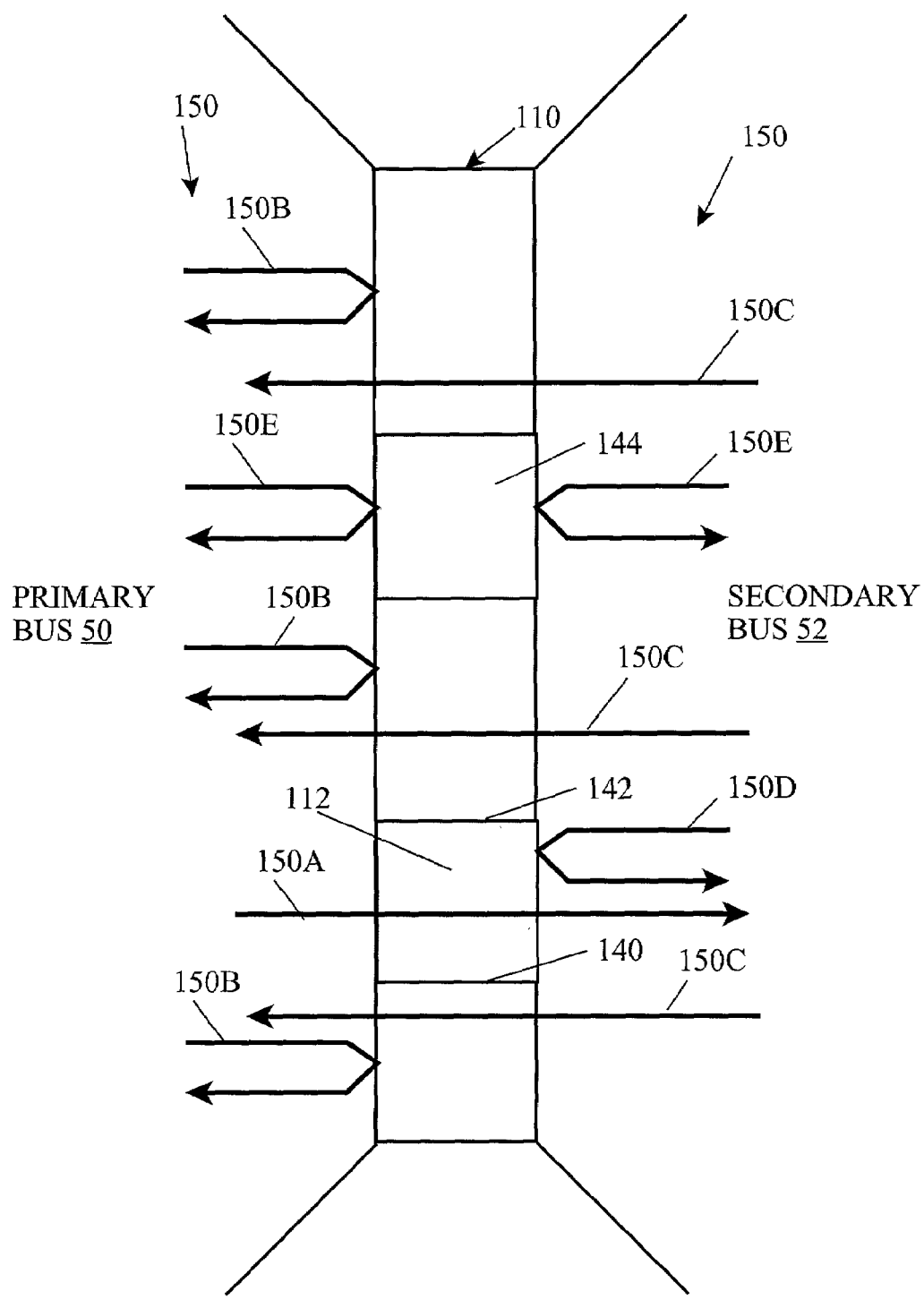
FIG. 4 shows memory transaction forwarding by the I/O adapter of FIG. 2.

Turning to FIG. 4, operation of bridge 34 (FIG. 3) will be described in greater detail through explanation of forwarding of memory transactions between a primary bus 50 and a secondary bus 52. In most instances, bridge 34 operates as a conventional transparent PCI bridge. That is, the integrity of a system memory 110 is maintained by bridge 34 reserving (or allocating) a memory address range 112 of system memory 110 for a respective I/O device. As previously noted, the PCI Specifications allow a bridge to claim two separate memory address ranges—prefetchable and non-prefetchable—both of which function the same as shown in FIG. 4. For clarity, however, only one is shown in FIG. 4.

For purposes of further discussion, "system memory" shall refer to a memory address map that includes all of the memories accessible to CPU 12 and processor 40. Accordingly, it should be recognized that system memory may include memory(ies) not illustrated. System memory may reside at a single physical location comprising one or more types of data storage, or be distributed across a plurality of physical systems. Further, system memory may comprise any known type of data storage system and/or transmission media, including magnetic media, optical media, a data object, etc.

Memory address range 112 is reserved by memory address range reserver 44 of bridge 34 specifying the bridge's memory base address register and its memory limit address register. The registers define a bridge memory base 140 and a bridge memory limit 142. In addition, opaque memory region reserver 46 of bridge 34 reserves an opaque memory region 144 within system memory 110. Implementation of opaque memory region 144 will be described in the next section.

Memory transactions 150 are forwarded by memory transaction forwarding (MTF) module 48 (FIG. 3) between primary bus 50 and secondary bus 52 as shown in FIG. 4. In most cases, MTF module 48 operates as a conventional transparent PCI/PCIx system. That is, MTF module 48 forwards memory transactions 150 from primary bus 50 (left side of FIG. 4) to secondary bus 52 (right side of FIG. 4) only when a memory transaction 150A falls within memory address range 112. A memory transaction 150A may be any transaction that requires action by the respective I/O device, e.g., a peer-to-peer activity. Otherwise, a memory transaction 150B initiated on primary bus 50 that is outside of memory address range 112 is ignored, i.e., not claimed by bridge 34. Memory transaction 150B may be, for example, any transaction that does not require action by the respective I/O device. Similarly, MTF module 48 forwards a memory transaction from secondary bus 52 to primary bus 50 only when the memory transaction 150C falls outside of memory address range 112. Memory transactions 150C may be, for example, an I/O device conducting a direct memory access (DMA). Otherwise, a memory transaction 150D initiated on secondary bus 52 that is within memory address range 112 is ignored.

In addition to the conventional transparent PCI/PCIx operation described above, MTF module 48 ignores any memory transaction 150E that falls within opaque memory region 144 regardless of whether the memory transaction is initiated on the primary or secondary bus. Cumulatively, the above activities can be stated as follows: bridge 34 via MTF module 48 forwards a memory transaction from the primary bus 50 to secondary bus 52 only when the memory transaction falls within memory address range 112 and outside of opaque memory region 144, and forwards a memory transaction from secondary bus 52 to primary bus 50 only when the memory transaction falls outside of memory address range 112 and outside of opaque memory region 144. When memory address range 112 and opaque memory region 144 overlap, MTF module 48 treats the overlap as though it is part of the opaque memory region. That is, it ignores any memory transaction at the overlap.

Implementation of opaque memory region 144 provides an I/O adapter 18 having a bridge 34 that provides a memory region that is inaccessible to memory transactions which traverse the bridge either from the primary bus 50 to secondary bus 52 or from secondary bus 52 to primary bus 50. As a result, memory transactions 150 which target the opaque memory region 144 are ignored by bridge 34, allowing for the same address to exist on both sides of the bridge with different data stored in each. Memory transactions from secondary bus 52 to primary bus 50 ignored by bridge 34 are completed within I/O adapter subsystem memory 42, hence, relieving host computer system 10 memory resources. Similarly, memory transactions initiated on primary bus 50 that are ignored by bridge 34 are prevented from accessing I/O adapter reserved memory, i.e., opaque memory region 144, and are completed within the host memory system between agents that do not reside on secondary bus 52 of bridge 34. A user can employ a number of I/O adapters 18 each with a bridge 34 in a single computer system 10 because bridge 34 allows the system to use the same memory space for the host and each I/O adapter 18.

IV. Opaque Memory Region Reserver

Opaque memory region 144 can be implemented in a number of ways by memory region reserver 46. In one embodiment, reserver 46 implements region 144 by controlling five programmable registers contained within an I/O device specific configuration register space as well as an external package pin. The five programmable registers and the external package pin are defined as follows:

1. Opaque Memory Enable Register

Bit 0 of this one byte register, when set to a binary '1' enables the Opaque Memory Base, Opaque Memory Limit, Opaque Memory Base Upper 32 bits, and the Opaque Memory Limit Upper 32 bits registers. The reset value of this register is controlled by the state of the external package pin, referred ed to as 'Opaque_en.' When Opaque_en is set to a logical '1' (i.e., tied to VDD), bit 0 of this register is reset to a binary '1' at power up and for all subsequent PCI reset events, thereby enabling opaque memory region 144. When Opaque_en is set to a logical '0' (i.e., tied to ground), bit 0 of this register is reset to a binary '0' at power up and for all subsequent PCI reset events, thereby disabling opaque memory region 144. Software may modify the contents of this register after reset.

2. Opaque Memory Base Register

The high order 12 bits of this two byte register specify address bits 31:20 of the base of opaque memory region 144. These 12 bits have a reset value of x'000' but may be set by software to any value after reset. The low order 4 bits of this two byte register are set to binary '0001' to indicate that opaque memory region 144 is defined by 64 bit addresses. These low order 4 bits cannot be modified by software. Bits 19:0 of the base of opaque memory region 144 are assumed to be x'0 0000' and not specified by a register.

3. Opaque Memory Limit Register

The high order 12 bits of this two byte register specify address bits 31:20 of the limit of opaque memory region 144. These 12 bits have a reset value of x'FFF', but may be set by software to any value after reset. The low order 4 bits of this two byte register are set to binary '0001' to indicate that opaque memory region 144 is defined by 64 bit addresses. These low order 4 bits cannot be modified by software. Bits 19:0 of the limit of opaque memory region 144 are assumed to be x'F FFFF' and are not specified by any register.

4. Opaque Memory Base Upper 32 Bits Register

This four byte register specifies address bits 63:32 of the base of opaque memory region 144. This register has a reset value of x'FFFF FFFF', but may be set by software to any value after reset.

5. Opaque Memory Limit Upper 32 Bits Register

This four byte register specifies address bits 63:32 of the limit of opaque memory region 144. This register has a reset value of x'FFFF FFFF', but may be set by software to any value after reset.

6. External Package Pin: Opaque_en

When Opaque_en is set to a logical '1' (i.e., tied to VDD), bit 0 of Opaque Memory Region Enable Register is reset to a binary '1', thereby enabling opaque memory region 144. When Opaque_en is set to a logical '0' (i.e., tied to ground), bit 0 of the Opaque Memory Enable Register is reset to a binary '0' thereby disabling opaque memory region 144. Software may modify the contents of the Opaque Memory Enable Register after reset, regardless of the state of the Opaque_en pin. The Opaque_en pin can be used to enable opaque memory region 144 after reset or on a D3hot to D0 power management state change to the default range of x'FFFF FFFF 0000 0000' to x'FFFF FFFF FFFF FFFF' for those applications which cannot use software to modify opaque memory region 144 after reset or on a power management state change.

It should be recognized that the above implementation is exemplary and that a variety of other mechanisms are possible in order to implement the teachings of the invention.

V. Method

The invention also includes a method of forwarding memory transactions on a bridge between a primary and a secondary bus. The method comprises the steps of: reserving a memory address range 112 of system memory 110; reserving an opaque memory region 144 of system memory 110; and forwarding a memory transaction 150: a) from primary bus 50 to secondary bus 52 only when memory transaction 150 falls within range 112 and outside of opaque memory region 144, and b) from secondary bus 52 to primary bus 50 only when memory transaction 150 falls outside of range 112 and outside of opaque memory region 144. As indicated above, when range 112 and opaque memory region 144 overlap, forwarding occurs as though the overlap is opaque memory region 144.

In the previous discussion, it will be understood that the method steps discussed may be performed by: hardware contained within bridge 34, e.g., MTF 48; and by a set of registers and control hardware within the bridge, e.g., reservers 44, 46. However, it is understood that the various devices, modules, mechanisms and systems described herein may be realized in hardware or software, or a combination of hardware and software, and may be compartmentalized other than as shown. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after the following: (a) conversion to another language, code or notation; and/or (b) reproduction in a different material form.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims. For example, although the teachings of the invention have been applied to an I/O adapter, a bridge according to the invention may be implemented in other physical locations within a computer system.

What is claimed is:

1. A bridge for forwarding memory transactions between a primary bus and a secondary bus, the bridge comprising:
   a memory address range reserver that claims a range of system memory;
   an opaque memory region reserver that claims an opaque memory region of system memory, wherein the opaque memory region overlaps the range of system memory; and
   a memory transaction forwarding module that:
      a) forwards a memory transaction from the primary bus to the secondary bus only when the memory transaction falls within the range and outside of the opaque memory region, and
      b) forwards a memory transaction from the secondary bus to the primary bus only when the memory transaction falls outside of the range and outside of the opaque memory region.

2. The bridge of claim 1, wherein when the range and the opaque memory region overlap, the memory transaction forwarding module treats the overlap as though it is part of the opaque memory region.

3. The bridge of claim 1, wherein the bridge is of a peripheral component interconnect (PCI) type.

4. The bridge of claim 1, wherein the bridge is of a peripheral component interconnect extended (PCIx) type.

5. The bridge of claim 1, wherein the bridge is part of an I/O adapter.

6. The bridge of claim 5, wherein the I/O adapter further comprises a processor, a memory, at least one PCI device and a PCI bus in communication with the bridge, the processor, the memory and the at least one PCI device.

7. The bridge of claim 6, wherein the secondary bus is part of the I/O adapter.

8. A method of forwarding memory transactions on a bridge between a primary and a secondary bus, the method comprising the steps of:
   reserving a memory address range of system memory;
   reserving an opaque memory region of system memory, wherein the opaque memory region overlaps the range of system memory; and
   forwarding a memory transaction:
      a) from the primary bus to the secondary bus only when the memory transaction falls within the range and outside of the opaque memory region, and
      b) from the secondary bus to the primary bus only when the memory transaction falls outside of the range and outside of the opaque memory region.

9. The method of claim 8, wherein when the range and the opaque memory region overlap, forwarding occurs as though the overlap is the opaque memory region.

10. The method of claim 8, wherein the bridge is of a peripheral component interconnect (PCI) type.

11. The method of claim 8, wherein the bridge is of a peripheral component interconnect extended (PCIx) type.

12. The method of claim 8, wherein the bridge is part of an I/O adapter.

13. The method of claim 12, wherein the I/O adapter further comprises a processor, a memory, at least one PCI device and a PCI bus in communication with the bridge, the processor, the memory and the at least one PCI device.

14. The method of claim 12, wherein the secondary bus is part of the I/O adapter.

15. An input-output (I/O) adapter for communicating between a primary bus and a secondary bus, the I/O adapter comprising:
   a bridge for forwarding memory transactions between the primary bus and the secondary bus, the bridge including:
      a memory address range reserver that claims a range of system memory;
      an opaque memory region reserver that claims an opaque memory region of system memory, wherein the opaque memory region overlaps the range of system memory; and
      a memory transaction forwarding module that:
         a) forwards a memory transaction from the primary bus to the secondary bus only when the memory transaction falls within the range and outside of the opaque memory region, and
         b) forwards a memory transaction from the secondary bus to the primary bus only when the memory transaction falls outside of the range and outside of the opaque memory region.

16. The I/O adapter of claim 15, wherein when the range and the opaque memory region overlap, the memory transaction forwarding module treats the overlap as though it is part of the opaque memory region.

17. The I/O adapter of claim 15, wherein the bridge is of a peripheral component interconnect (PCI) type.

18. The I/O adapter of claim 15, wherein the bridge is of a peripheral component interconnect extended (PCIx) type.

19. The I/O adapter of claim 15, further comprising a processor, a memory, at least one PCI device and a PCI bus in communication with the bridge, the processor, the memory and the at least one PCI device.

20. The I/O adapter of claim 15, wherein the secondary bus is part of the I/O adapter.

* * * * *